(12) United States Patent
Rao et al.

(10) Patent No.: US 7,689,576 B2
(45) Date of Patent: Mar. 30, 2010

(54) DILATION OF SUB-FLOW OPERATORS IN A DATA FLOW

(75) Inventors: Dinkar Venkatraman Rao, San Jose, CA (US); Martin A. Siegenthaler, San Francisco, CA (US); Sriram Srinivasan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/372,516

(22) Filed: Mar. 10, 2006

(65) Prior Publication Data

US 2007/0214176 A1    Sep. 13, 2007

(51) Int. Cl.
  *G06F 7/00*  (2006.01)
  *G06F 17/00* (2006.01)
  *G06F 9/44*  (2006.01)
(52) U.S. Cl. .................... 707/101; 717/106
(58) Field of Classification Search ............. 715/763
   See application file for complete search history.

(56) References Cited

U.S. PATENT DOCUMENTS

| | | | | |
|---|---|---|---|---|
| 4,813,013 A * | 3/1989 | Dunn | ............ | 715/763 |
| 4,901,221 A * | 2/1990 | Kodosky et al. | ......... | 715/771 |
| 5,497,500 A * | 3/1996 | Rogers et al. | ........... | 717/109 |
| 5,577,253 A | 11/1996 | Blickstein | | |
| 5,850,548 A * | 12/1998 | Williams | ........... | 717/107 |
| 5,857,180 A | 1/1999 | Hallmark et al. | | |
| 5,966,532 A * | 10/1999 | McDonald et al. | ......... | 717/105 |
| 6,014,670 A | 1/2000 | Zamanian et al. | | |
| 6,044,217 A | 3/2000 | Brealey et al. | | |
| 6,098,153 A | 8/2000 | Fuld et al. | | |
| 6,208,345 B1 * | 3/2001 | Sheard et al. | ........... | 715/853 |
| 6,208,990 B1 | 3/2001 | Suresh et al. | | |
| 6,243,710 B1 | 6/2001 | DeMichiel et al. | | |
| 6,282,699 B1 * | 8/2001 | Zhang et al. | ........... | 717/114 |
| 6,434,739 B1 | 8/2002 | Branson et al. | | |
| 6,449,619 B1 | 9/2002 | Colliat et al. | | |
| 6,480,842 B1 | 11/2002 | Agassi et al. | | |
| 6,604,110 B1 | 8/2003 | Savage et al. | | |
| 6,738,964 B1 * | 5/2004 | Zink et al. | ........... | 717/105 |
| 6,772,409 B1 | 8/2004 | Chawla et al. | | |
| 6,795,790 B1 | 9/2004 | Lang et al. | | |
| 6,807,651 B2 * | 10/2004 | Saluja et al. | ........... | 716/2 |
| 6,839,724 B2 | 1/2005 | Manchanda et al. | | |
| 6,850,925 B2 | 2/2005 | Chaudhuri et al. | | |
| 6,968,326 B2 | 11/2005 | Johnson et al. | | |
| 6,968,335 B2 | 11/2005 | Bayliss | | |
| 6,978,270 B1 | 12/2005 | Carty et al. | | |

(Continued)

OTHER PUBLICATIONS

Konstantinides et al., "The Khoros Software Development Environment for Image and Signal Processing"; May 1994; IEEE, vol. 3; pp. 243-252.*

(Continued)

*Primary Examiner*—Kavita Padmanabhan
*Assistant Examiner*—Jeremy D Engelskirchen
(74) *Attorney, Agent, or Firm*—Patterson & Sheridan, LLP (57) ABSTRACT

A method for dilating a sub-flow operator in a data flow is provided. The data flow is traversed to locate sub-flow operators. The data flow bound to a sub-flow operator is retrieved. The sub-flow operators are then injected into the data flow.

10 Claims, 4 Drawing Sheets

U.S. PATENT DOCUMENTS

| | | | |
|---|---|---|---|
| 7,031,987 | B2 | 4/2006 | Mukkamalla et al. |
| 7,035,786 | B1 | 4/2006 | Abu et al. |
| 7,340,718 | B2 * | 3/2008 | Szladovics et al. .......... 717/106 |
| 2002/0046301 | A1 | 4/2002 | Shannon et al. |
| 2002/0170035 | A1 | 11/2002 | Casati et al. |
| 2003/0033437 | A1 | 2/2003 | Fischer et al. |
| 2003/0037322 | A1 * | 2/2003 | Kodosky et al. ............ 717/162 |
| 2003/0051226 | A1 | 3/2003 | Zimmer et al. |
| 2003/0101098 | A1 | 5/2003 | Schaarschmidt |
| 2003/0110470 | A1 | 6/2003 | Hanson et al. |
| 2003/0149556 | A1 | 8/2003 | Riess |
| 2003/0154274 | A1 | 8/2003 | Nakamura |
| 2003/0182651 | A1 | 9/2003 | Secrist et al. |
| 2003/0233374 | A1 * | 12/2003 | Spinola et al. ........... 707/104.1 |
| 2004/0054684 | A1 | 3/2004 | Geels |
| 2004/0068479 | A1 | 4/2004 | Wolfson et al. |
| 2004/0107414 | A1 * | 6/2004 | Bronicki et al. ............. 717/105 |
| 2004/0220923 | A1 | 11/2004 | Nica |
| 2004/0254948 | A1 | 12/2004 | Yao |
| 2005/0044527 | A1 | 2/2005 | Recinto |
| 2005/0055257 | A1 | 3/2005 | Senturk et al. |
| 2005/0091664 | A1 | 4/2005 | Cook et al. |
| 2005/0131881 | A1 | 6/2005 | Ghosh et al. |
| 2005/0137852 | A1 | 6/2005 | Chari et al. |
| 2005/0149914 | A1 * | 7/2005 | Krapf et al. ................. 717/136 |
| 2005/0174988 | A1 | 8/2005 | Bieber et al. |
| 2005/0188353 | A1 | 8/2005 | Hasson et al. |
| 2005/0227216 | A1 | 10/2005 | Gupta |
| 2005/0234969 | A1 * | 10/2005 | Mamou et al. .............. 707/102 |
| 2005/0240354 | A1 | 10/2005 | Mamou et al. |
| 2005/0240652 | A1 | 10/2005 | Crick |
| 2005/0256892 | A1 | 11/2005 | Harken |
| 2006/0036522 | A1 | 2/2006 | Perham |
| 2006/0074621 | A1 | 4/2006 | Rachman |
| 2006/0074730 | A1 * | 4/2006 | Shukla et al. ................... 705/8 |
| 2006/0101011 | A1 | 5/2006 | Lindsay et al. |
| 2006/0112109 | A1 | 5/2006 | Chowdhary et al. |
| 2006/0206869 | A1 | 9/2006 | Lewis et al. |
| 2006/0212475 | A1 | 9/2006 | Cheng |
| 2006/0228654 | A1 * | 10/2006 | Sanjar et al. ................ 430/438 |
| 2007/0078812 | A1 | 4/2007 | Waingold et al. |
| 2007/0157191 | A1 * | 7/2007 | Seeger et al. ................ 717/168 |
| 2007/0169040 | A1 * | 7/2007 | Chen .......................... 717/146 |
| 2007/0214111 | A1 | 9/2007 | Jin et al. |
| 2007/0214171 | A1 | 9/2007 | Behnen et al. |
| 2007/0214176 | A1 | 9/2007 | Rao et al. |
| 2007/0244876 | A1 | 10/2007 | Jin et al. |
| 2008/0168082 | A1 | 7/2008 | Jin et al. |

OTHER PUBLICATIONS

U.S. Appl. No. 09/707,504, filed Nov. 7, 2000, Banavar et al.
U.S. Appl. No. 11/083,064, filed Nov. 3, 2005, Harken et al.
U.S. Appl. No. 11/373,084, filed Mar. 10, 2006, Jin et al.
U.S. Appl. No. 11/372,540, filed Mar. 10, 2006, Jin et al.
U.S. Appl. No. 11/373,685, filed Mar. 10, 2006, Behnen et al.
Ferguson et al., "Platform Independent Translations for a Compilable Ada Abstract Syntax", Feb. 1993 ACM 0-89791-621-2/93/0000-0312, pp. 312-322.
Ramu, Method for Initializing a Platform and Code Independent Library, IBM Technical Disclosure Bulletin vol. 37, No. 9, Sep. 1994, pp. 637-638.
Arkusinski et al., "A Software Port from a Standalone Communications Management Unit to an Integrated Platform", 2002, IEEE, pp. 1-9.
Zhao et al., "Automated Glue/Wrapper Code Generation in Integration of Distributed and Heterogeneous Software Components", Proceedings of the 8$^{th}$ IEEE International Enterprise Distributed Object Computing Conf. (EDOC 2004), 2004, IEEE, pp. 1-11.
Tjoa et al. (Eds.), "Data Warehousing and Knowledge Discovery—Data Mapper: An Operator for Expressing One-to-Many Data Transformations", Proceedings of 7$^{th}$ International Conference, DaWaK 2005, Copenhagen, Denmark, Aug. 22-26, 2005, 11 pages.
Jardim et al., "Integration and Adoptability of Aps: the Role of ISO TC184/SC4 Standards", International Journal of Computer Applications in Technology, vol. 18, Nos. 1-4, 2003, pp. 105-116.
Simitsis, "Mapping Conceptual to Logical Models for ETL Processes", ACM Digital Library, 2005, pp. 67-76.
Yu, "Transform Merging of ETL Data Flow Plan", INSPEC. AN-7576766, IKE '03 International Conference 2003, pp. 193-198.
Werner et al., "Just-in-sequence material supply a simulation based solution in electronics", INSPEC AN 7576766, Robotics and Computer-Integrated Manufacturing, vol. 19, No. 1-2, pp. 107-111, Feb.-Apr. 2003.
Vassiliadis et al., "A generic and customizable framework for the design of ETL scenarios", Information Systems, Databases: Creation, Management and Utilization, vol. 30, Issue 7, 2005, pp. 492-525.
Gurd et al., "The Manchester Prototype Dataflow Computer", Communications of the ACM, 1985, vol. 28, No. 1, pp. 34-52.
Stewart et al., "Dynamic Applications from the Group Up", Haskell'05 Sep. 30, 2005, Tallinn, Estonia, ACM, pp. 27-38.
Carreira et al., "Execution of Data Mappers", IQIS, 2004, pp. 2-9, 2004 ACM 1-58113-902-0/04/0006, Paris, France.
Friedrich, II, Meta-Data Version and Configuration Management in Multi-Vendor Environments, SIGMOD, Jun. 14-16, 2005, 6 pgs., Baltimore, MD.
Hernandez et al., "Clio: A schema mapping tool for information integration", IEEE Computer Society, 2005.
Haas et al., "Clio Grows Up: From Research Prototype to Industrial Tool", SIGMOD, Jun. 14-16, 2005, 6 pgs., Baltimore, MD.
Poess et al., "TPC-DS, Taking Decision Support Benchmarking to the Next Level", ACM SIGMOD, Jun. 4-6, 2002, 6 pgs., Madison, WI.
Rafaieh et al., "Query-based data warehousing tool", DOLAP, Nov. 8, 2002, 8 pgs., McLean, VA.
Carreira, et al., "Data Mapper: An Operator for Expressing One-To-Many Data Transformations," A Min Tjoa and J. Trojillo (Eds.): DaWak 2005. LNCS 3589, pp. 136-145.
"Method and Apparatus for Modelling Data Exchange in a Data Flow of an Extract, Transform, and Load (ETL) Process," U.S. Appl. No. 11/621,521, filed Jan. 9, 2007.
Yu, "Transform Merging of ETL Data Flow Plan," INSPEC, An-8057504, International Conference on Information and Knowledge Engineering—IKE 03', Pt. vol. 1, 2003, pp. 193-198.
Ives et al, An Adaptive Query Execution System for Data Integration, 1999 ACM SIGMOD International Conference on Management of Data, pp. 299-310.
Office Action History for U.S. Appl. No. 11/373,084.
Office Action History for U.S. Appl. No. 11/372,540.
Office Action History for U.S. Appl. No. 11/373,685.

* cited by examiner

DILATION OF SUB-FLOW OPERATORS IN A DATA FLOW

CROSS-REFERENCE TO RELATED APPLICATIONS

Embodiments of the invention are related to the following applications entitled "CLASSIFICATION AND SEQUENCING OF MIXED DATA FLOWS", Ser. No. 11/373,084, filed on Mar. 10, 2006; "SYSTEM AND METHOD FOR GENERATING CODE FOR AN INTEGRATED DATA SYSTEM", Ser. No. 11/372,540, filed on Mar. 10, 2006; and "DATA FLOW SYSTEM AND METHOD FOR HETEROGENEOUS DATA INTEGRATION ENVIRONMENTS", Ser. No. 11/373,685, filed on Mar. 10, 2006. All of the above related applications are assigned to the same assignee, and incorporated herein by reference.

BACKGROUND OF THE INVENTION

1. Field of the Invention

The present invention relates generally to data processing systems, and more particularly to a computer implemented method, apparatus, and computer usable program code for dilating a sub-flow operator in a data flow.

2. Description of the Related Art

In enterprise application systems, consolidation of various data integration tools is inevitable due to frequent merges and acquisitions as normal business practices. Typical data integration applications are those types of applications in which data from multiple sources on varied data systems and repositories need to be processed, combined, or otherwise transformed into data that is then loaded into multiple targets, again residing on different data systems and repositories. The best application performance may be achieved by making sure that the total data integration processing is broken down into smaller components of processing modules and by ensuring that the appropriate runtime engine or runtime system is selected for the appropriate task.

For example, a database engine is the most appropriate engine for filtering rows of a relational table in a structured query language (SQL) database. Using the database engine is more efficient than pulling the data out of the database and into a text file, where the text file requires further filtering in order to insert the final data into another table in the same database. Structured query language (SQL) engines are specially optimized for such queries and tasks. In some cases, legacy data in text files or spreadsheets is best processed by a specialized engine, such as WebSphere Data Stage™, for example. A legacy data source is any file, database, or software asset (such as a web service or business application) that supplies or produces data and that has already been deployed.

However, the average developer may not be conversant with all types of processing engines and may be unable to effectively choose an engine or other processing component easily. As a result, an enterprise needs to employ experts for each variety and variation of engines.

The problem is that there are many runtime systems that work very differently, use various different protocols from each other, and are generally incompatible. Such heterogeneous systems also have different development paradigms, no common developer language, or even a uniform IDE. Additionally, new runtime systems keep getting added to the enterprise every so often. Currently such complex data integration applications rely on users developing separate systems of applications for each runtime system and writing specialized code for each pair of runtime systems to bridge the gap between them. As a result, current data integration applications do not allow data processing engines to operate in a truly integrated fashion.

For example, if a developer needs to have some processing in a SQL engine, followed by some processing in a conventional, specialized engine, the developer needs to hand code the way data is passed from one system to another. Some specialized engines already provide some limited support, especially for SQL engines.

In addition, current data integration applications do not make easy optimizations possible across the runtime engine boundaries, as frequently each engine is independent of the other and provided by different vendors. Furthermore, manual code is not rewritten easily when specialized new engines become available. Additionally, with current data integration applications, transaction processing also becomes difficult to account for when crossing engine domains.

SUMMARY OF THE INVENTION

The invention describes a computer implemented method, a computer program product and a data processing system for dilating a sub-flow operator in a data flow. The data flow is traversed to locate sub-flow operators. The data flow bound to a sub-flow operator is retrieved. The sub-flow operators are then injected into the data flow.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
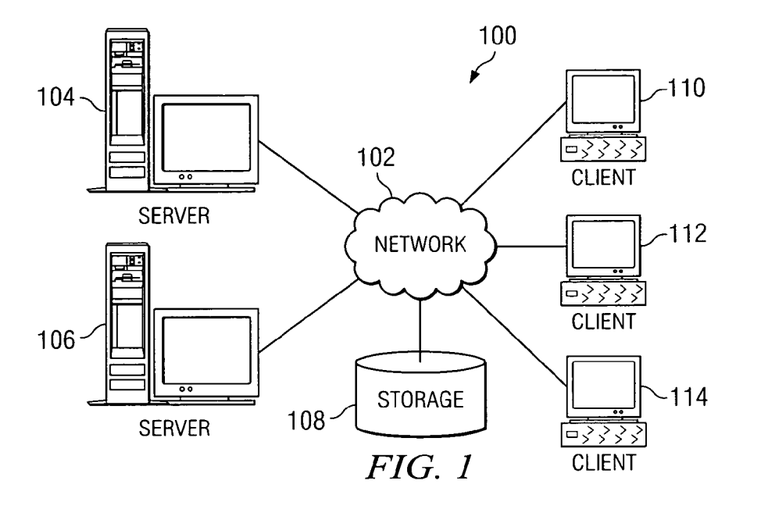
FIG. 1 is a pictorial representation of a network of data processing systems in which exemplary aspects of the present invention may be implemented.
Figure 2:
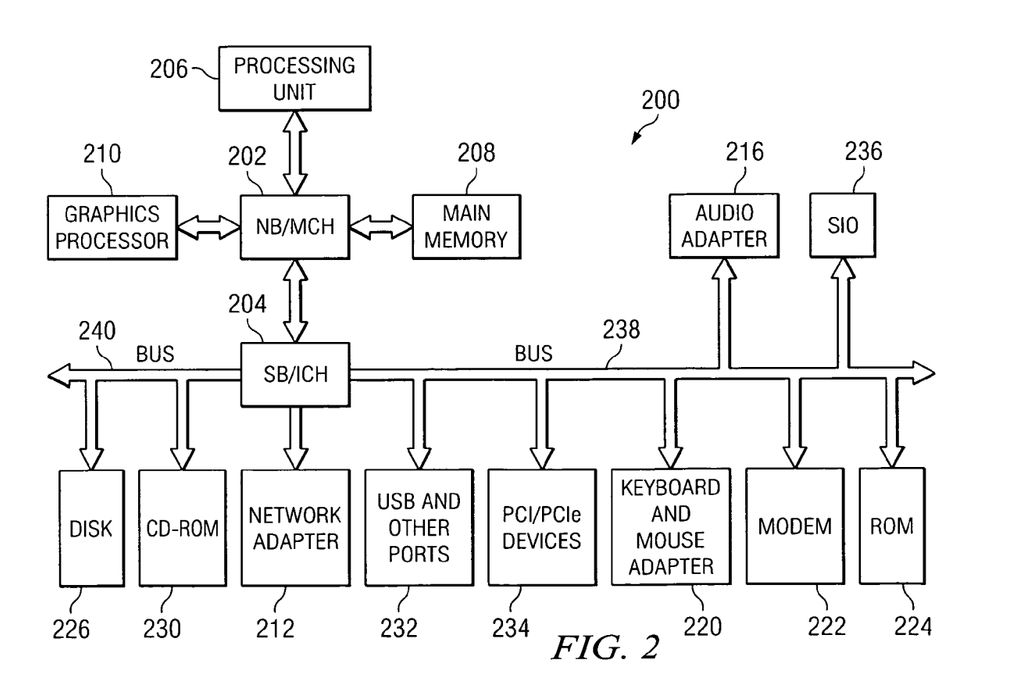
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, ROM 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
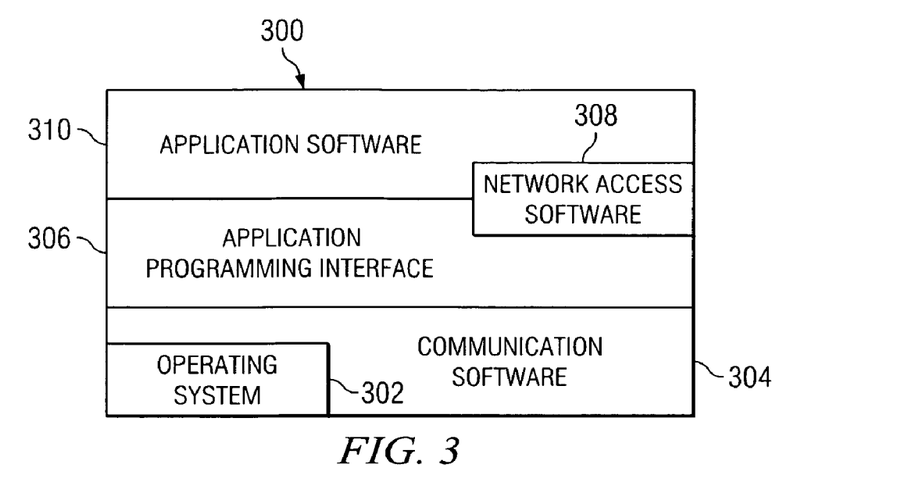
FIG. 3 is a block diagram showing typical software architecture for a server-client system in accordance with a preferred embodiment of the present invention.

Turning to FIG. 3, typical software architecture, generally designated by reference number 300, for a server-client system is depicted in accordance with a preferred embodiment of the present invention. At the lowest level, operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks. Applications at this level may include those necessary to handle data, video, graphics, photos or text, which can be accessed by users of the Internet.

Exemplary aspects of the present invention provide a computer implemented method, apparatus and computer usable program code for developing a sub-flow. Exemplary embodiments of the present invention provide an architecture and system that enables users to model logical flows of higher level operations, or data flows, which are then processed. A data flow, or flow, is a depiction of a logical transformation and flow of data, not the execution of the flow of data. A data flow is a specialized logical operator graph used to indicate a specific instance of data transformation sequence and semantics. A data flow uses virtual tables, which are a collection of virtual columns, to describe the structure of data moving through links, from one operator to another. Virtual columns are similar in concept to structured query language (SQL) relational columns, having a data type, precision, length as appropriate. Virtual tables are similar in concept with SQL relational tables. However, since a data flow is a logical model, no SQL or physical storage modeling is imposed, unless decided later by the code generation engine. The virtual tables thus indicate a form of inter-operator semantics. An exemplary embodiment of the present invention provides a system and method that uses iconic representation in a graphical user interface (GUI) to implement moving data around data processing systems.

The illustrative embodiments describe a solution and the architecture of a system that enables users to model logical flows of higher level operations that are then processed. In an exemplary embodiment of the present invention, a flow is composed on a canvas by moving operators from a palette to the canvas and interconnecting the operators. The flow is emended within control flow(s) which are compiled, deployed and executed on disparate systems. A canvas refers to the blank area of the GUI where icons representing operators can be dragged and dropped in order to build flows and sub-flows. A palette is a group of icons representing the operators that the user can choose from when creating a flow or sub-flow. In the context of the aspects of the present invention, the term operator refers to an iconic representation of an operation that needs to be performed on data. A fundamental operator is an operator that is not composed of any other operators.

Each operator presented on the palette can run on a different system unbeknownst to the user. A user may be presented with three I/O operators, such as messaging, file, and stream, for example, each executing within a different manufacturer's system, such as Microsoft MSMQ™, DataStage IBM™, and Time10 Oracle™, for example. It is the responsibility of the underlying software stack to take care of the interaction between the various systems.

In order to build a flow, a number of disparate expertises need to come together. Someone needs to understand where the data resides, the data's format, semantics, and eventual schema. Rarely does a single user have a complete knowledge of this information. More frequently, this knowledge is distributed among a number of individuals. A sub-flow enables individual contributors to create components that may be used by others to compose a flow. The contributors create sub-flows imbued with their expertise of their particular area. These sub-flows, once created, are saved and assigned an iconic representation, referred to as a sub-flow operator, which may then be added to the palette. Thus a future user may simply drag and drop that sub-flow operator onto the canvas and the whole, previously created sub-flow, is placed there. In this way, once a sub-flow has been created, this sub-flow may be reused multiple times.

The use of sub-flow operators accelerates the development of flows. Sub-flows may be created by sector experts and distributed to developers. Sector experts are those people who have specialized knowledge or expertise in a particular area, such as, for example, a marketing expert, an advertising expert, a scanner data expert, and the like. The developer uses the sub-flow operator as he/she would a fundamental operator, capitalizing on the expert's knowledge and experience. The sub-flow is composed of fundamental operators and possibly other sub-flows. The underlying systems know nothing of the sub-flows and are not required to implement the sub-flows.

Making the development of flows easier will lead to more flows being developed and processed. The more flows that are developed the greater the utilization of data. The more the data is used the aggregate cost of the data declines.

A graph-like data structure is commonly used to model the sequence of operations in typical data processing activities. Each node in this graph represents a single logical step in the entire process. A link is used to interconnect nodes in this Logical Operator Graph (LOG) instance. The LOG is composed of nodes, interconnected by links. Each node, or operator, has specific semantics and property values that indicate the specific type of data processing operation performed.

A flow is a specialized logical operator graph used to indicate a specific instance of data transformation sequence and semantics. The flow uses virtual tables, a collection of virtual columns, to describe the structure of data moving through the links, from one operator to another. Virtual columns are similar in concept to structured query language (SQL) relational columns, having a data type, precision, and length as appropriate. Virtual tables are similar in concept with SQL relational tables. However, since the flow is a logical model, no SQL or physical storage modeling is imposed, unless decided later by the code generation engine. The virtual tables thus indicate a form of inter-operator semantics.

Operators have a set of 0 . . . n Inputs, known as input ports, and a set of 0 . . . n Outputs, known as output ports. In general a port is a connection through which data is sent and received. Ports are bound to operators and handle the data moving into or out of the operator. Ports are depicted as a connection that the data flows in and out of on the outside of an operator's icon. Depending on the semantics of the operation, an operator may allow the addition of ports during the design and manipulation of the graph. Operators have a set of properties. These values are manipulated by the graph instance designer to govern the parameters of this particular operator. These properties may be of different types of data, such as, for example, but not limited to, integers, lists, strings, expressions, database table, file, and so on.

Links interconnect different operators. Data, described by a virtual table, exits from one operator's output port and enters into another operator's input port. There may be multiple links exiting through one output port. However, one input port can accept only one incoming link. If an operator requires two incoming links, then two different input ports must be defined for the operator. Links may have properties too, to explicitly identify the semantics of the interconnection between two operators in a graph. Ports also may have properties defined. These port level properties are similarly of a specific data type, and such port properties are used to provide additional operational parameters in context to the specific input or output.

Each type of operation that needs to be performed by the system is described by an operator definition. An operator definition is a specification that comprises: (i) a name that uniquely identifies its functionality; (ii) the runtime engine that supports this function; (iii) A set of input ports, if any, each uniquely named and each port associated with its staging input preferences in order; (iv) a set of output ports, if any, each uniquely named and each port associated with its staging output choices available; (v) a set of properties that can be set by the user to customize the functionality of this operation; and (vi) an operator specific code generator module that conforms to the system's code generation engine interface. The system's LOG level code generator invokes this operator specific code generator whenever an instance of this operator type is encountered. Examples of staging preferences include, but are not limited to, temporary tables, persistent tables, queue, flat file, XML file, and so forth.

A sub-flow is developed by creating a flow and saving it as a sub-flow. A saved sub-flow comprises a description of all the operators, both fundamental and sub-flow. A flow is composed using the sub-flow operator. During the code generation phase of a flow the sub-flow is expanded into the flow. The GUI may drive multiple systems, each with their own idiosyncrasies that require a specialist to realize the full potential of the system. An exemplary embodiment of the present invention enables users to capitalize on the specialist's expertise of the underlying systems. The sub-flow imbues the specialist's skill within the operators.

Applications are developed by binding operators together in a dataflow. An application retrieves data from data sources, transforms the data, and writes it to a repository. An application as rudimentary as this requires an understanding of format of the data and the transformation that is required. It is reasonable to assume that data would be used in various applications. Having a sub-flow operator that any flow may utilize increases developers' productivity. Code is written and debugged once but utilized multiple times, increasing the value of both the data and code through repeated use.

Figure 4:
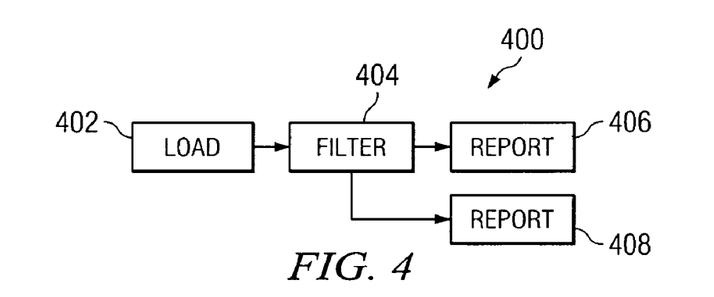
FIG. 4 is a block diagram of a rudimentary flow.

FIG. 4 is a block diagram of a rudimentary flow. A flow is created by moving operators from a palette onto the canvas, connecting the operators, defining the mapping, and setting the parameters. The mapping involves not only mapping from one operator to the next operator, but also mapping translation from one frame of reference to another, as necessary. For example, a field may be referred to as "address" in one set of records and "location" in another set of records. Flow 400 comprises load operator 402, filter operator 404, report operator 406, and report operator 408. Load operator 402 causes data to be loaded and sent to filter operator 404. Filter operator 404 filters the data and sends the appropriate data to report operator 406 and report operator 408. Report operator 406 and report operator 408 cause their respective reports to be produced, in accordance with their parameters.

A sub-flow is created in the same manner as a flow. Operators are selected from the pallet, dropped onto the canvas and connected; properties, parameters and mappings are configured as appropriate. Upon saving the selections, the sub-flow is available for use within a flow or another sub-flow. Furthermore, a sub-flow pallet has two additional operators that act as proxies to the sub-flow's input and output ports. The sub-flow input and output ports are bound to operator ports within the sub-flow.

Figure 5:
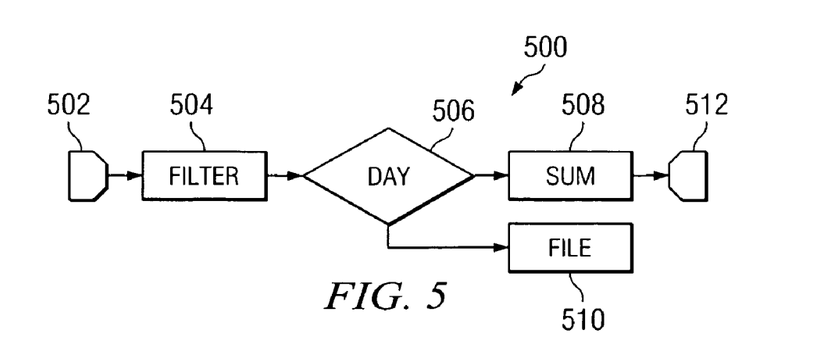
FIG. 5 is a block diagram depicting a sub-flow, in accordance with an exemplary embodiment of the present invention.

FIG. 5 is a block diagram depicting a sub-flow, in accordance with an exemplary embodiment of the present invention. Sub-flow 500 comprises input port 502, filter operator 504, day operator 506, sum operator 508, file 510, and output port 512. Input port 502 and output port 512 are the two extra operators that act as proxies to the sub-flow's input and output ports and are referred to herein as input and output ports. As can be seen from FIG. 5, data enters sub-flow 500 through input port 502 and goes to filter operator 504. From filter operator 504, data flows to day operator 506. From day operator 506 the information is sent to file operator 510 or sum operator 508. From sum operator 508 the data flows to output port 512 and leaves sub-flow 500.

The connection between operators in a flow is via input and output ports. The same mechanism is used to interconnect operators within the flow to the sub-flow. The ports are the interface between the sub-flow and the flow operators in these examples. Sub-flows are used in development of new flows and behave in the same way as a fundamental operator. The sub-flow operator is available as an icon on the pallet. The user is able to drag the icon onto the canvas and connect it to the other sub-flow operators or fundamental operators.

Figure 6:
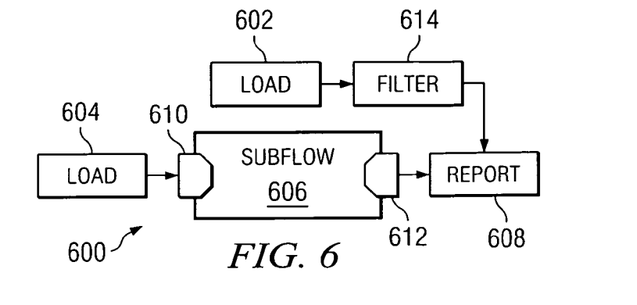
FIG. 6 is a block diagram depicting a flow having a sub-flow, in accordance with an exemplary embodiment of the present invention.

FIG. 6 is a block diagram depicting a flow having a sub-flow, in accordance with an exemplary embodiment of the present invention. Flow 600 comprises load operators 602 and 604, filter operator 614, sub-flow operator 606, input port 610, output port 612, and report operator 608. While flow 600 shows input port 610 and output port 612 as visible in sub-flow operator 606, they are only visible in the present example for the purposes of illustration and explanation. In normal or actual use, sub-flow operator 606 looks like any other operator to the user. Internally, the sub-flow definition includes the binding to the internal operator port. According to flow 600, information from load operator 602 flows to filter operator 614 and from filter operator 614 into report operator 608. Load operator 604 sends information to sub-flow 606 through input port 610. Sub-flow 606 performs its operation and passes the information out through output port 612 to report operator 608.

Before the flow is passed to the code generation phase, all sub-flow operators are expanded. Expanding sub-flow operators is also referred to as dilating. Thus, dilating a sub-flow means to expand sub-flow operators. A flow with sub-flow operators is rewritten before the flow is processed by the code generator. The process entails two phases: (i) dilation of the flow by expanding the sub-flows; and (ii) bridging the ports for each sub-flow operator in the flow. The dilation phase is comprised of the following steps: (i) traversing the flow, locating all the sub-flow operators; (ii) retrieving the flow bound to the sub-flow operator; and (iii) injecting the retrieved flows into the flow. Injecting the retrieved flows is a multi-step process for merging the sub-flow with the flow that involves formatting the operators in the sub-flow to operate with the flow. Formatting operators may involve processes such as copying and renaming the operators. In the present illustrative examples, the process of injecting involves copying, renaming, such as from FILTER to FILTER', for example, and inserting each operator of the sub-flow into the flow from the sub-flow, the inserted sub-flow's links accompany the operators as well. After a sub-flow is injected, a disconnected flow will exist, which must be connected.

Figure 7:
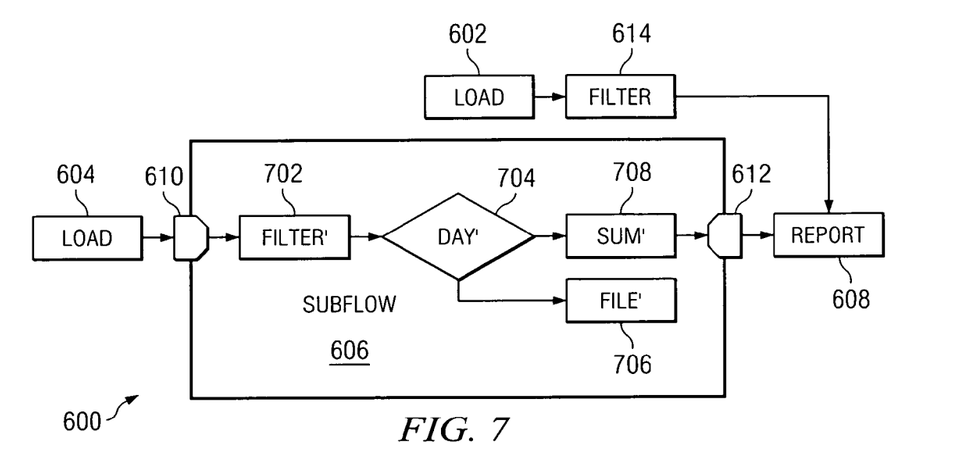
FIG. 7 is a block diagram depicting a flow having a sub-flow, expanded, in accordance with an exemplary embodiment of the present invention.

FIG. 7 is a block diagram depicting a flow having a sub-flow, expanded, in accordance with an exemplary embodiment of the present invention. FIG. 7 shows the block diagram of FIG. 6 with sub-flow operator 606 expanded, as occurs during the dilation phase. Flow 600 comprises load operators 602 and 604, filter operator 614, sub-flow operator 606, input port 610, output port 612, and report operator 608. Expanded sub-flow operator 606 shows the same sub-flow as was created in FIG. 5; however, the operators have been renamed. Sub-flow operator 606 comprises filter' operator 702, day' operator 704, sum' operator 708, and file' operator 706.

The port bridging phase involves linking ports connected to the sub-flow operator with the sub-flow's operator. For each sub-flow input port, such as input port 610, the following steps are performed: in step 1, the corresponding external operator output port is located, which, in the example in FIG. 7, is the output port of load operator 604. This is the operator port that will feed the sub-flow input port. Next, the internal port that is bound to the sub-flow input port via binding is located, which in the present example is input port 702. This binding involves working out the operator name that was generated during the injection step. Next, the external operator's output port is connected to the internal operator's input port.

An equivalent set of steps occurs for the output ports. For each sub-flow output port, such as output port 612, the following steps are performed: the corresponding external operator input port is located, which is the operator port that receives the output port data. In the present example, the external operator input port is the input port for report operator 608. Next, the internal port that is bound to the sub-flow output port via the sub-flow binding is located. In the present example this port is output port 708. Next, the internal operator output port is connected to the external operator's input port. Once dilation and bridging has been completed for a sub-flow operator, the traversal process continues walking the process. Dilation is repeated for every sub-flow operator within the flow until all the sub-flow operators are dilated. If no dilation were necessary while traversing the flow the sub-flow operator expansion phase is complete, otherwise the traversal is started from the beginning of the expanded flow.

Figure 8:
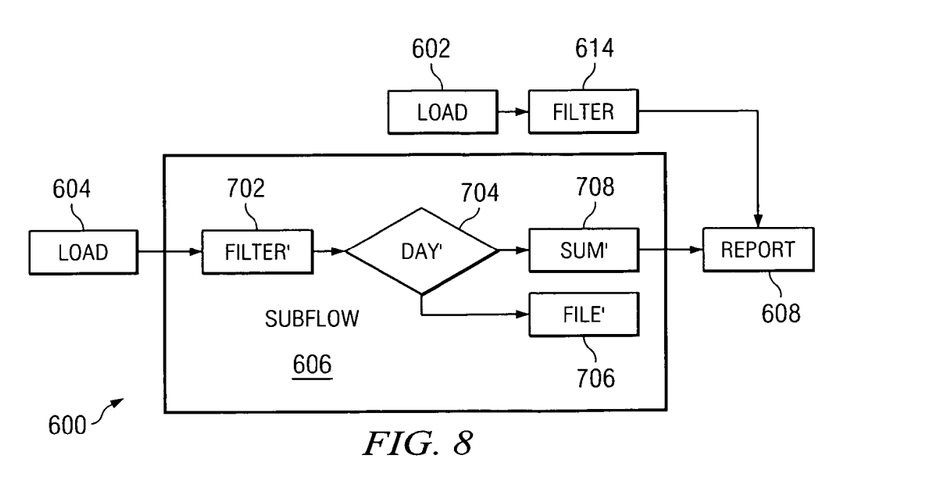
FIG. 8 is a block diagram depicting a flow having a sub-flow, expanded, and integrated, in accordance with an exemplary embodiment of the present invention.

FIG. 8 is a block diagram depicting a flow having a sub-flow, expanded, and integrated, in accordance with an exemplary embodiment of the present invention. FIG. 8 shows the same block diagram as FIG. 7, but after integration; thus, input port 610 and output port 612 are gone, as the ports have been bridged. After all the sub-flows in flow have been expanded, the flow is passed onto the code generator.

Figure 9:
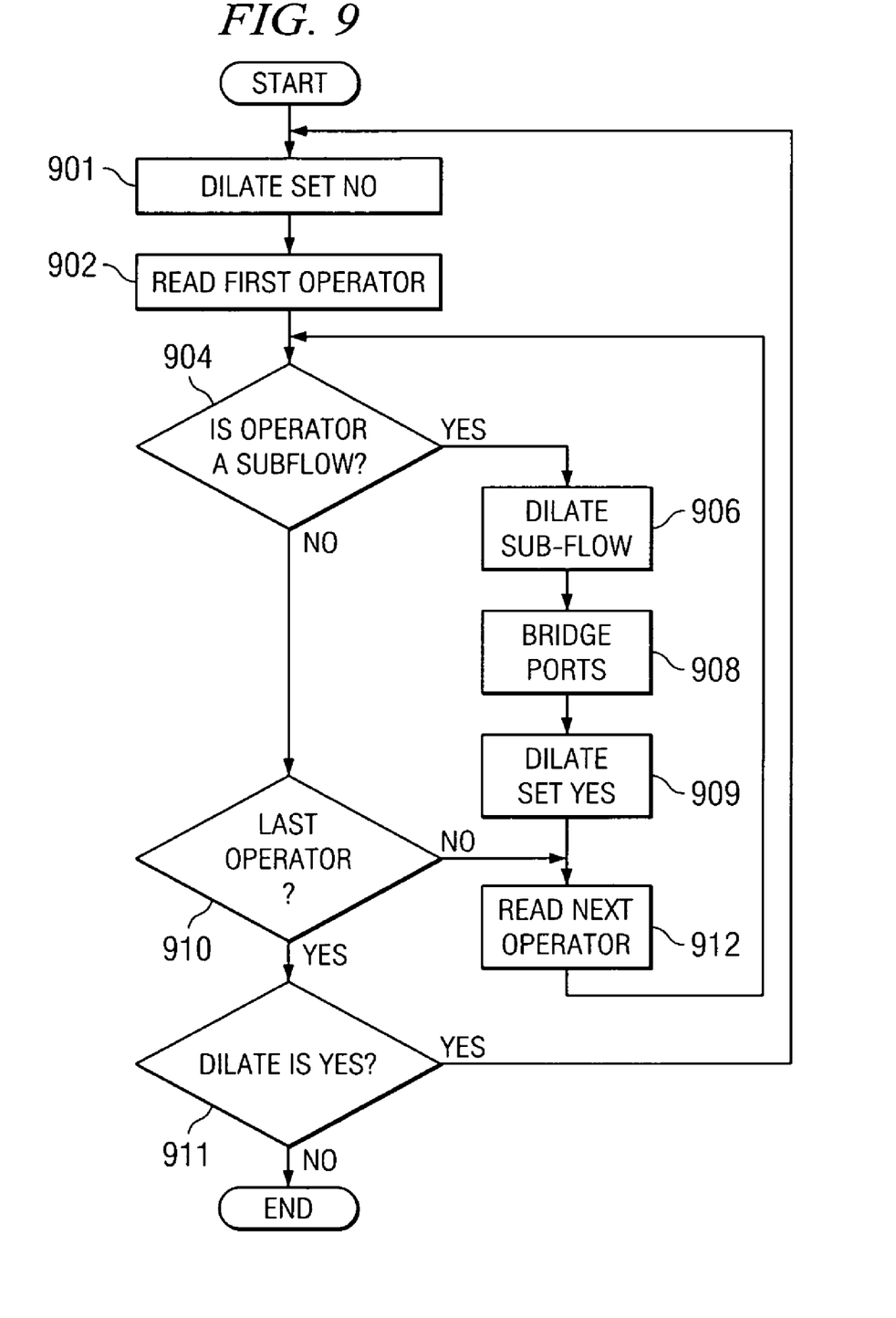
FIG. 9 is a flowchart depicting the operation of expanding sub-flows in a flow, in accordance with an exemplary embodiment of the present invention.

FIG. 9 is a flowchart depicting the operation of expanding sub-flows in a flow, in accordance with an exemplary embodiment of the present invention. The operation begins by setting a flag indicating that a sub-flow has not been dilated (step 901), then reading the first operator of the flow (step 902). The operation determines if the operator is a sub-flow operator (step 904). If the operation determines that the operator is a sub-flow operator (a yes output to step 904), the operation dilates the sub-flow (step 906). Next, the operation bridges the ports between the flow and the sub-flow (step 908) and sets the DILATE flag to yes, indicating that a sub-flow has been dilated (step 909). The operation then returns to step 912 and reading the next operator in the flow.

If the operation determines that the operator is not a sub-flow operator (a no output to step 904), the operation next determines if the operator is the last operator in the flow (step 910). If the operation determines that the operator is not the last operator (a no output to step 910), the operation proceeds to read the next operator in the flow (step 912). Then the operation returns to step 904 and determines if the operator is a sub-flow operator. If the operation determines that the operator is the last operator (a yes output to step 910), operation determines if a sub-flow has been dilated while processing the flow (step 911). If the operation determines that a sub-flow operator has been dilated (a yes output to step 911), the operation proceeds to resetting the DILATE flag (step 901). If the operation determines that no sub-flow operator has been dilated (a no output to step 911), the operation ends.

Other products implement subroutines or sub processes in lieu of sub-flow. In either case the user is presented with an equivalent interface but the underlying execution is different. The subroutine is bound to the execution environment within which it is composed. In the context of a sub-flow, the sub-flow is bound when the code is generated. A flow may be composed once and applied against different execution environments during code generation. The late binding to the execution environment allows sub-flows to be used that did not exist when the sub-flow was composed. For example, a developer composes a sub-flow that extracts deep echo location data from a file and transfers the data to a tomographic transformation operator, resulting in a field map. The field map sub-flow is built into an oil well drilling application. The application locates wells, but it takes 3 months to execute due to the computational intensity of the transformation. The company purchases a tomographic transformation processor (TTP). The slow tomographic transformation operator is replaced by one that interacts with the TTP. In order for the application to take advantage of the TTP, the application is passed through the code generation phase, again. The code for the flow and sub-flows remains the same.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dilating a sub-flow operator in a first data flow, the computer implemented method comprising:
    executing a code generation application on a processor, wherein the code generation application configures the processor for:
    traversing the first data flow to locate sub-flow operators, wherein each sub-flow operator is associated with a corresponding sub-flow, each sub-flow itself comprises a set of one or more operators, and wherein each sub-flow operator is bound to other operators in the first data flow through at least one input port of the sub-flow operator and at least one output port of the sub-flow operator;
    for each located sub-flow operator, retrieving the sub-flow corresponding to the sub-flow operator;
    injecting the corresponding sub-flows into the first data flow, wherein injecting each sub-flow comprises:
        copying each operator in the sub-flow,
        renaming each operator in the sub-flow, to form renamed operators, and
        inserting the renamed operators into the first data flow, thereby replacing the sub-flow operator in the first data flow;
    bridging at least the one input port and the one output port of the sub-flow operator to ports of operators in the first data flow; and
    sending the first data flow for code generation, wherein the code generation comprises generating application source code representing the work flow.

2. The computer implemented method of claim 1, wherein traversing the first data flow to locate sub-flow operators comprises:
    reading an operator;
    determining if the operator is a sub-flow operator; and
    repeating the reading and determining steps until all the operators in the data flow are read.

3. The computer implemented method of claim 1, further comprising:
    in response to a determination that at least one sub-flow operator was encountered, repeating the traversing, retrieving, and injecting steps.

4. A computer implemented method for generating a data flow for an application, the computer implemented method comprising:
    executing a code generation application on a processor, wherein the code generation application configures the processor for:
    receiving a user-composed data flow of high-level operations, the user composing the data flow by selecting one or more heterogeneous sub-flows through a graphical user interface;
    dilating the data flow to integrate the one or more heterogeneous sub-flows, comprising:
        traversing the data flow to locate sub-flow operators, wherein each sub-flow operator is associated with a corresponding sub-flow, each sub-flow itself comprising a set of one or more operators, and wherein each sub-flow operator is bound to other operators in the data flow through at least one input port of the sub-flow operator and at least one output port of the sub-flow operator;
        for each located sub-flow operator, retrieving the sub-flow corresponding to the sub-flow operator;
        injecting the corresponding sub-flows into the data flow, wherein injecting each sub-flow comprises:
            copying each operator in the sub-flow,
            renaming each operator in the sub-flow, to form renamed operators, and
            inserting the renamed operators into the data flow, thereby replacing the sub-flow operator in the data flow;
    bridging at least the one input port and the one output port of the sub-flow operator to ports of operators in the data flow; and
    sending the data flow for code generation, wherein the code generation comprises generating application source code representing the work-flow.

5. A computer readable storage medium containing a program which, when executed by a computer processor, performs an operation, comprising:
    executing a code generation application on a processor, wherein the code generation application configures the processor for:
    traversing the first data flow to locate sub-flow operators, wherein each sub-flow operator is associated with a corresponding sub-flow, each sub-flow itself comprises a set of one or more operators, and wherein each sub-flow operator is bound to other operators in the first data flow through at least one input port of the sub-flow operator and at least one output port of the sub-flow operator;
    for each located sub-flow operator, retrieving the sub-flow corresponding to the sub-flow operator;

injecting the corresponding sub-flows into the first data flow, wherein injecting each sub-flow comprises:
copying each operator in the sub-flow,
renaming each operator in the sub-flow, to form renamed operators, and
inserting the renamed operators into the first data flow, thereby replacing the sub-flow operator in the first data flow;
bridging at least the one input port and the one output port of the sub-flow operator to ports of operators in the first data flow; and
sending the first data flow for code generation, wherein the code generation comprises generating application source code representing the work flow.

6. The computer readable storage medium of claim 5, wherein traversing the first data flow to locate sub-flow operators comprises:
reading an operator;
determining if the operator is a sub-flow operator; and
repeating the reading and determining steps until all the operators in the data flow are read.

7. The computer readable storage medium of claim 5, wherein the operation further comprises:
in response to a determination that at least one sub-flow operator was encountered, repeating the traversing, retrieving, and injecting steps.

8. A system, comprising:
a processor; and
a memory containing a code generation application for execution on the processor, wherein the code generation application configures the processor for:
traversing the first data flow to locate sub-flow operators, wherein each sub-flow operator is associated with a corresponding sub-flow, each sub-flow itself comprises a set of one or more operators, and wherein each sub-flow operator is bound to other operators in the first data flow through at least one input port of the sub-flow operator and at least one output port of the sub-flow operator,
for each located sub-flow operator, retrieving the sub-flow corresponding to the sub-flow operator,
injecting the corresponding sub-flows into the first data flow, wherein injecting each sub-flow comprises:
copying each operator in the sub-flow;
renaming each operator in the sub-flow, to form renamed operators; and
inserting the renamed operators into the first data flow, thereby
replacing the sub-flow operator in the first data flow,
bridging at least the one input port and the one output port of the sub-flow operator to ports of operators in the first data flow, and
sending the first data flow for code generation, wherein the code generation comprises generating application source code representing the work flow.

9. The system of claim 8, wherein traversing the first data flow to locate sub-flow operators comprises:
reading an operator;
determining if the operator is a sub-flow operator; and
repeating the reading and determining steps until all the operators in the data flow are read.

10. The system of claim 8, wherein the code generation application further configures the processor for:
in response to a determination that at least one sub-flow operator was encountered, repeating the traversing, retrieving, and injecting steps.

* * * * *